May 26, 1942.  W. KOHLHAGEN  2,284,395
SELF-STARTING SYNCHRONOUS-ELECTRIC MOTOR
Filed June 29, 1940  2 Sheets-Sheet 1

Inventor
Walter Kohlhagen
Attorneys

May 26, 1942.  W. KOHLHAGEN  2,284,395
SELF-STARTING SYNCHRONOUS-ELECTRIC MOTOR
Filed June 29, 1940   2 Sheets—Sheet 2

Inventor
Walter Kohlhagen
by Seymour Earle Nichols
Attorneys

Patented May 26, 1942

2,284,395

UNITED STATES PATENT OFFICE 2,284,395

SELF-STARTING SYNCHRONOUS-ELECTRIC MOTOR

Walter Kohlhagen, Elgin, Ill.

Application June 29, 1940, Serial No. 343,218

2 Claims. (Cl. 172—278)

The present invention relates to improvements in synchronous-electric motors for use in conjunction with alternating current of commercial frequencies, and more particularly the present invention relates to self-starting synchronous-electric motors primarily designed for the propulsion of clocks and other time instruments, though not so limited.

One of the main objects of the present invention is to provide a superior self-starting synchronous-electric motor-structure characterized by fewness of parts and low cost for manufacture.

Another object of the present invention is to provide a superior self-starting synchronous-electric motor-structure in which the employment of shading-coils or the like may be dispensed with without depriving the motor-structure of adequate self-starting torque as well as synchronous torque.

A further object of the present invention is to provide a superior self-starting synchronous-electric motor-structure in which the features having high eddy-current-characteristics are so located as to readily dissipate the resultant heat and thus maintain the entire motor-structure at safe and efficient temperatures.

With the above and other objects in view, as will appear to those skilled in the art from the present disclosure, this invention includes all features in the said disclosure which are novel over the prior art and which are not claimed in any separate application.

In the accompanying drawings, in which certain modes of carrying out the present invention are shown for illustrative purposes:

The particular self-starting alternating-current synchronous-electric motor-structure herein chosen for the purpose of illustrating the present invention includes an energizing-coil 20 of usual tubular form having two leads 21 and 22 which are adapted to be connected to any convenient source of alternating current such, for instance, as 110-volt 60-cycle alternating current commonly employed as a power supply in homes, etc.

Extending axially through the energizing-coil 20 is a laminated core 23 formed of magnetic material such, for instance, as soft iron or silicon steel and projecting at its respective opposite ends beyond the adjacent ends of the said energizing-coil.

Figure 6:
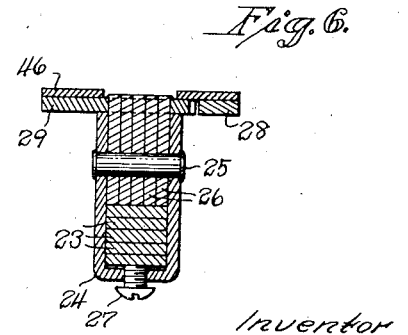
Fig. 6 is a similar view taken on the line 6—6 of Fig. 2.
Figure 7:
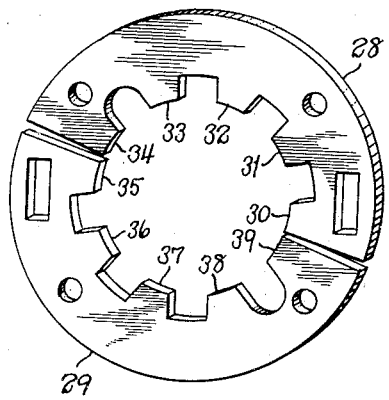
Fig. 7 is a perspective view of the two complemental pole-pieces detached and shown in their normal spaced relationship.
Figure 8:
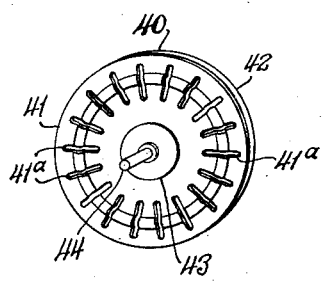
Fig. 8 is a perspective view of the rotor-unit, detached.
Figure 9:
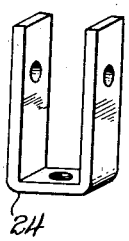
Fig. 9 is a similar view of one of the coupling-yokes, detached.

Each of the respective opposite ends of the laminated core 23 projects into the adjacent one of two corresponding coupling-yokes 24—24 preferably formed of soft iron or the like and secured by means of a rivet 25 to the respective opposite sides of one of two laminated studs 26—26 formed of iron or other suitable magnetic material. The laminations of each of the studs 26—26 extend at a right angle to the laminations of the core 23 and the said core is firmly pressed against the outer or rear ends of the respective laminated studs 26—26 by means of clamping-screws 27—27 one of which latter is located in the transverse reach of each of the coupling-yokes 24—24 before referred to, and is especially well shown in Fig. 6.

The forward end of each of the laminated studs 26—26 extends through and is riveted over against the forward face of one of two substantially-semicircular complemental pole-pieces 28 and 29.

The complemental pole-pieces 28 and 29, above referred to, are formed of magnetic material and have certain characteristics which will be more fully hereinafter discussed. The pole-piece 28 is formed with an annular series of five (more or less) inwardly-extending salient polar-projections respectively designated 30, 31, 32, 33 and 34. Similarly the complemental pole-piece 29 is provided with a series of five (more or less) inwardly-extending salient polar-projections respectively designated by the reference characters 35, 36, 37, 38 and 39 and respectively located diametrically opposite the salient polar-projections 30, 31, 32, 33 and 34 of the complemental pole-piece 28.

The two series of salient polar-projections 30—31—32—33—34 and 35—36—37—38—39 jointly "surround." so to speak, the periphery of a rotor-unit generally designated by the reference character 40 and comprising a plate-like rotor-member 41 and a concentric cup-shaped rotor-member 42. Both of the rotor-members 41 and 42 are formed of magnetic material and preferably the flange of the cup-shaped rotor-member 42 is in engagement with the opposing face of the complemental plate-like rotor-member 41. Preferably the rotor-member 41 is formed with an annular series of equidistant slots 41a.

Figure 5:
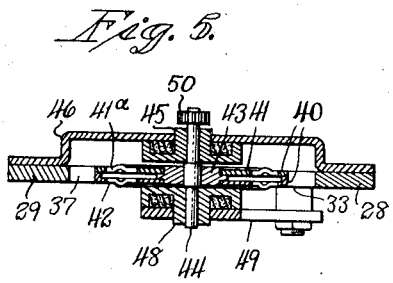
Fig. 5 is a broken detail sectional view taken on the line 5—5 of Fig. 2.

Both of the rotor-members 41 and 42 of the rotor-unit 40 are mounted upon a hub 43 preferably formed of brass or other non-magnetic material and in turn rigidly mounted upon a rotor-shaft 44 as is especially well shown in Fig. 5. The forward portion of the rotor-shaft 44 revolves in a bearing 45 carried centrally in a substantially-cup-shaped frame-member 46 preferably formed of brass or other suitable non-magnetic material. In addition to providing a support for the bearing 45 the frame member 46 serves to hold the pole-pieces 28 and 29 in their predetermined relationships by being attached thereto by a suitable number of screws 47.

The rear end of the rotor-shaft 44 revolves in a bearing 48 supported in a bridge-member 49 which in turn is secured to the pole-pieces 28 and 29 and hence to the cup-shaped frame-member 46 before referred to. The forward end of the rotor-shaft 44 mounts a driving-pinion 50 which may be meshed into the time-train of a clock or such other device as it may be desired to synchronously drive.

The pole-pieces 28 and 29 before referred to are preferably formed of a very soft grade of iron or mild steel having a relatively-high electro-conductivity and therefore having a high eddy-current-loss characteristic and low hysteresis characteristics as compared to the rotor-unit 40 as will be more fully hereinafter described. The pole-pieces 28 and 29 furthermore, are relatively thick preferably in the order of .095 inch (.040 inch having proven unsatisfactory) when the dimension A (Fig. 4) is approximately $\tfrac{5}{16}$ inch. This thickness factor is one which contributes to the desired high eddy-current-loss characteristic of the said pole-pieces for purposes as will hereinafter appear.

Preferably the plate-like rotor-member 41 of the rotor-unit 40 is formed of a relatively-high-carbon steel (.80 to .90 carbon) and is suitably hardened to impart to it a high degree of magnetic retentivity. The complemental cup-shaped rotor-member 42 is preferably formed of substantially the same character of steel as the plate-like rotor-member 41 save that the metal is preferably left in an annealed condition.

The rotor-unit 40 as thus constituted has a relatively low eddy-current-loss characteristic as compared to the pole-pieces 28 and 29 and also a relatively-high hysteresis characteristic as compared to the said pole-pieces.

From the foregoing it will be seen that contrary to usual practices the stator-structure comprising the two pole-pieces 28 and 29 is made relatively thick to encourage the circulation of eddy currents therein, whereas normal practice would require that for its given or other comparable thickness the stator-structure be composed of relatively-thin laminations in order to discourage the circulation of eddy currents. With these facts in mind, and the before-stated relative characteristics of the rotor-unit 40 also in mind, it will be seen that without employing any shading coils the eddy currents generated in the pole-piece 28, for instance, will cause a progressively increasing lag in the magnetic flux in the salient polar-projections 30, 31, 32, 33 and 34 in the order named. By way of illustration it will be seen that the salient polar-projection 30, being closest to the point of magnetic input from the energizing-coil 20, will respond more rapidly to the imposed polarity than will the remaining salient polar-projections 31, 32, 33 and 34. Similarly the salient polar-projection 31 will respond more promptly to the impressed magnetic polarity than will the next more remote polar-projection 32. Similar conditions will prevail as between the polar-projections 32 and 33 and, in turn, between the polar-projection 33 and the polar-projection 34. In other words, the nearer the given polar-projection of the pole-piece 28 is to the point of flux-input (the adjacent laminated stud 26), the more rapidly will the polar-projection respond to the impressed magnetic polarity. The effects just referred to will result in the exertion upon the rotor-unit 40 of a rotary-field effect.

The pole-piece 29 similarly has a lag between its various salient polar-projections 35, 36, 37, 38 and 39 due to the generation of eddy currents, so that the magnetic flux in the polar-projection 36 will lag with respect to the magnetic flux in the polar-projection 35, and similarly the magnetic flux in each of the remainder of the series of polar-projections will lag behind the magnetic flux in the polar-projection having a lower reference numeral. From these facts it will be seen that the pole-piece 29, like the pole-piece 28 before referred to, will cause its salient polar-projections 35, 36, 37, 38 and 39 to also exert a rotary-field effect upon the rotor-unit 40 when current is supplied to the energizing-coil 20.

The pole-pieces 28 and 29 are characterized by having a relatively-high eddy-current-loss characteristic and a relatively-low hysteresis characteristic as compared to the corresponding characteristics of the rotor-unit 40. The referred-to characteristics of the pole-pieces 28 and 29 are the result of a suitable combination of specific resistance of the material employed and of cross-sectional form (relatively-great thickness) to provide a low-resistance path for the flow of eddy currents.

On the other hand, the rotor-unit 40 is so constituted and arranged as to provide a proper combination of specific resistance and of cross-sectional resistance-path to provide the desired relatively-low eddy-current-loss characteristic and high hysteresis characteristic.

It has been observed that both the specific resistance of the materials chosen for either the stator-structure or the rotor-unit may be varied in one direction or another, dependent upon the variations in the cross-sectional resistance-paths provided by the parts in question.

In any event, and as before stated, the pole-pieces 28 and 29, in order to discharge their intended functions, should have the relatively-high eddy-current-loss characteristic as compared to the rotor-unit 40.

Figure 1:
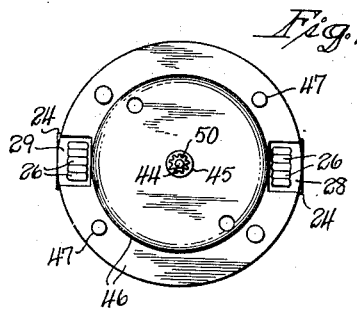
Fig. 1 is a view in front elevation of a self-starting synchronous-electric motor embodying the present invention.
Figure 4:
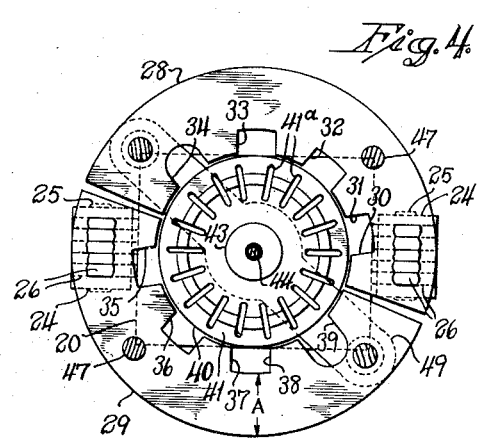
Fig. 4 is a sectional view taken on the line 4—4 of Fig. 2.
Figure 2:
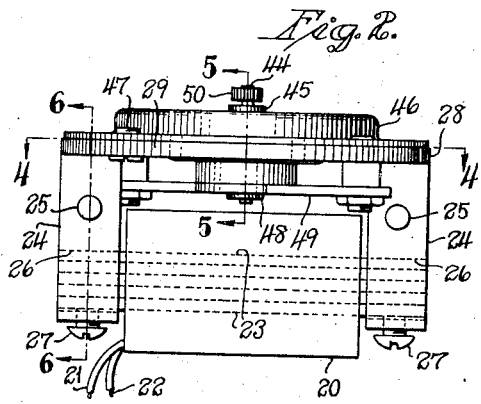
Fig. 2 is an underside view thereof but on a larger scale.
Figure 3:
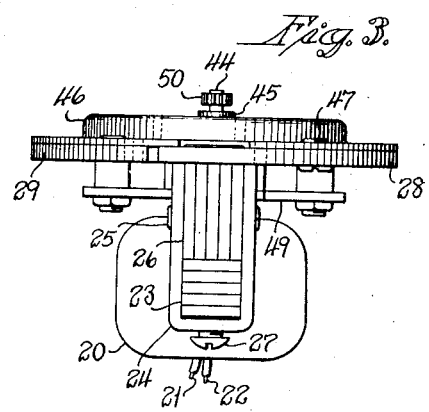
Fig. 3 is a side view thereof.

It will be noted by reference to Fig. 4 in particular, that the particular salient polar-projections at the end of a given one of the pole-pieces 28 and 29 are spaced more nearly to the terminal polar-projections of the other pole-piece than the spacing between any two polar-projections of an individual pole-piece. This arrangement serves to accentuate the torque applied to the rotor-unit 40.

Figure 10:
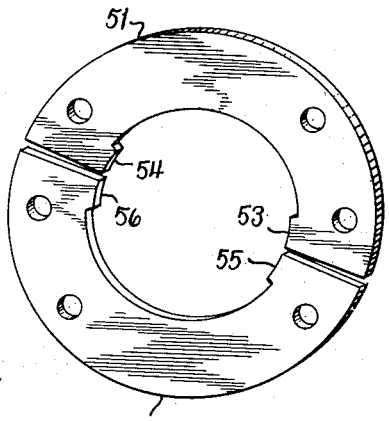
Fig. 10 is a perspective view corresponding to Fig. 7 but showing a pair of complemental pole-pieces of modified form.
Figure 11:
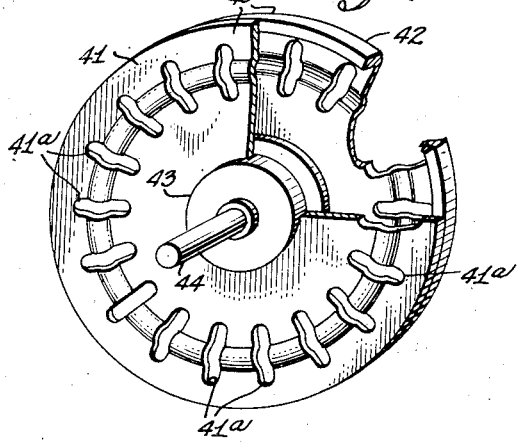
Fig. 11 is a perspective view partly in section and on an enlarged scale, of the rotor-unit.

In lieu of the pole-pieces 28 and 29 before described, two substantially-similar semicircular pole-pieces 51 and 52 may be employed, as is shown in Fig. 10. The pole-piece 51 is provided with but two salient polar-projections respectively designated as 53 and 54. Similarly the pole-piece 52 is provided with two polar-projections 55 and 56.

It will be seen by reference to Fig. 10 that if alternating magnetic flux is supplied to the pole-piece 51 adjacent its polar-projection 53, the other polar-projection 54 will, owing to the intervention of eddy currents, etc., have its magnetic flux lag behind that of the first-mentioned polar-projection 53. Under conditions as just described, the alternating magnetic flux fed in adjacent the polar-projection 56 of the complemental pole-piece 52 would cause substantially-instant response in the said polar-projection, but the magnetic response in the companion polar-projection 55 would be caused to lag. The pole-pieces 51 and 52, otherwise than as just described, have substantially the same characteristics as those described in connection with the pole-pieces 28 and 29 and both will exert a rotary-field effect upon a rotor used in conjunction with them.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A self-starting alternating-current synchronous-electric motor-structure including in combination: two plate-like substantially-semicircular pole-pieces formed of magnetic material and arranged in substantially the same plane and in opposition to each other to constitute a substantially-ring-like stator, each of the said pole-pieces having a plurality of salient polar-projections extending inwardly toward the polar-projections of the other of the pole-pieces, each of the said polar-projections having a circumferential inner face-width substantially corresponding to the width of the gaps therebetween; an alternating-current energizing-coil associated with the said substantially-semicircular pole-pieces and imparting opposite instantaneous polarity respectively thereto; and a rotor of magnetic material revolvable interiorly of the two said pole-pieces adjacent the salient polar-projections thereof, the said rotor having an annular series of perforations spaced from each other at an angular distance substantially corresponding to the angular face-width of the polar-projections of the said pole-pieces; the said substantially-semicircular pole-pieces having relatively-high eddy-current-loss characteristics and relatively-low hysteresis characteristics as compared to the similar characteristics of the said rotor, and the said rotor having relatively-low eddy-current-loss characteristics and high hysteresis characteristics as compared to the two said pole-pieces.

2. A self-starting alternating-current synchronous-electric motor-structure including in combination: two plate-like substantially-semicircular pole-pieces formed of magnetic material and arranged in substantially the same plane and in opposition to each other to constitute a substantially-ring-like stator, each of the said pole-pieces having a plurality of salient polar-projections extending inwardly toward polar-projections of the other of the pole-pieces, each of the said polar-projections having a circumferential inner face-width substantially corresponding to the width of the gaps therebetween; and a rotor-unit of magnetic material revolvable adjacent the salient polar-projections of the two said substantially-semicircular pole-pieces and comprising a rotor-member of relatively-high hysteresis characteristics and a complemental rotor-member adjacent thereto and having relatively-low hysteresis characteristics, each of the said rotor-members having an annular series of perforations spaced from each other at an angular distance substantially corresponding to the angular face-width of the polar-projections of the said pole-pieces; the said substantially-semicircular pole-pieces having relatively-high eddy-current-loss characteristics and relatively-low hysteresis characteristics as compared to the said rotor-unit and the rotor-members of the said rotor-unit jointly providing relatively-low eddy-current-loss characteristics and relatively-high hysteresis characteristics as compared to the two said substantially-semicircular pole-pieces.

WALTER KOHLHAGEN.